United States Patent [19]

Kendall-Smith et al.

[11] 4,115,509
[45] Sep. 19, 1978

[54] MOULDING OF FILLED SYNTHETIC PLASTICS MOULDING COMPOSITIONS

[75] Inventors: Brian John Kendall-Smith, Birmingham; Michael Glynn Bonnington, Sedgley, both of England

[73] Assignee: British Industrial Plastics Ltd., England

[21] Appl. No.: 845,217

[22] Filed: Oct. 25, 1977

Related U.S. Application Data

[63] Continuation of Ser. No. 630,174, Nov. 10, 1975, abandoned.

[30] Foreign Application Priority Data

Nov. 12, 1974 [GB] United Kingdom ............... 48980/74

[51] Int. Cl.² .............................................. B29B 5/04
[52] U.S. Cl. .................................... 264/331; 260/849; 264/349
[58] Field of Search ................... 264/176 R, 328–329, 264/349, 211, 323, 331; 260/849

[56] References Cited

U.S. PATENT DOCUMENTS

| | | | |
|---|---|---|---|
| 2,615,205 | 10/1952 | Gray | 264/174 |
| 2,936,487 | 5/1960 | Paz | 264/108 |
| 3,078,511 | 2/1963 | Street | 260/51 R |
| 3,137,038 | 6/1964 | Maynard | 425/214 |
| 3,194,868 | 7/1965 | Shaw | 264/329 |
| 3,746,489 | 7/1973 | Rizzi et al. | 425/205 |
| 3,789,103 | 1/1974 | Sueyoshi et al. | 264/329 |
| 3,816,558 | 6/1974 | Huck | 260/8.38 |

FOREIGN PATENT DOCUMENTS

779,364   9/1954   United Kingdom ..................... 264/349

OTHER PUBLICATIONS

Schneider et al. — The Manufacture of Phenolic Moulding Materials by Extrusion — Compounding— British Plastics, Nov. 1957, pp. 480–482.
Kirk-Othmer Encyclopedia of Chem. Technology, vol. 15, 6–1969, Phenolic Resins, pp. 201 & 202.
Miles et al. –Polymer Technology-Nov. 1965–Aminoplasts–pp. 52–62.
Hughes-SPE Journal-3-1970, vol. 26–Injection Molding the Ureas and Melamines . . . pp. 27–32.

*Primary Examiner*—Jeffery R. Thurlow

[57] ABSTRACT

Cured thermoset plastics artefacts, (including extrusions) are made directly from a non-homogeneous blend of a filler and a solid particulate thermosetting material, by use of a screw injection moulding machine (or screw extruder) which is operated to cause the non-homogeneous blend to plasticize or flux so that a homogeneous intimate mixture of the filler and the thermosetting material is formed in the barrel of the machine. Thus, the moulding (or extrusion) sequence includes the provision or formation of the non-homogeneous blend in the barrel.

8 Claims, No Drawings

MOULDING OF FILLED SYNTHETIC PLASTICS MOULDING COMPOSITIONS

This is a continuation of application Ser. No. 630,174 filed Nov. 10, 1975 now abandoned.

This invention concerns improvements in or relating to the moulding of thermosetting moulding compositions. An essential feature of the manufacture of thermosetting moulding compositions has been the pre-mastication of the thermosetting resinous material (used as curable matrix) with the filler(s) so that the latter becomes fully compounded with, impregnated by, and coated with, the resinous material. This may be effected under either 'dry' conditions where the resinous material is essentially solid and is melted or fluxed during the mastication processing, or in the presence of a solvent or other liquid medium optionally followed by drying. The resultant moulding compound is subsequently converted, in a separate stage, into cured artefacts by a moulding or extrusion process.

U.S. Pat. No. 3,746,489 discloses a method of manufacturing glass fibre-reinforced mouldings by mixing the fibres and a liquid thermosetting resin material to form a viscous dough-like mixture which is fed continuously for direct transfer to an injection device having a nozzle through which the mixture is injected into the cavity of a mould for reaction of the mixture to form cured mouldings. The objects of this prior method are to facilitate handling of the glass fibres, to ensure adequate dispersion of the fibres in the resin material, and to maintain fibre length so that no significant loss of properties occurs. To meet these objects, a special method of and apparatus for, mixing the fibres with the resin material are proposed. The dough-like material fed directly from the mixing apparatus to the injection device is, essentially, a homogeneous intimate mixture of the fibres in the resin material, and, as is well known in the art, the compounding action of the injection device must be minimized to prevent fibre degradation. We have discovered that injection moulding machines and extruders can be used to effect final compounding of rough blends of fillers in thermosetting resin materials and to produce cured artefacts directly from such materials without previously forming a homogeneous intimate dispersion of the filler in the resin and without using specially designed mixing apparatus.

In a homogeneous dispersion, the filler (or reinforcing material) particles are intimately mixed with and impregnated or coated with the resin; in a non-homogeneous blend of the type used in our process, the filler is not coated or impregnated to any great extent by the resin, but becomes intimately compounded therewith only in the injection or extruding machine.

According to the present invention, we provide a method of producing moulded synthetic plastics artefacts by a continuous moulding or extrusion sequence which comprises:
(a) providing in a screw injection moulding machine or screw extruder a non-homogeneous blend of a filler and a solid particulate thermosetting material,
(b) operating the injection moulding machine or extruder so that
  i the non-homogeneous blend is converted in the barrel of the machine or extruder into a plasticized intimate homogeneous composition and
  ii the plasticized composition is conveyed directly to a mould or extrusion head, and
(c) curing the composition conveyed to the mould or extruson head.

The thermosetting material will comprise a material which is capable of condensing to form a cured matrix (hereafter referred to as a thermosetting substance) in which may be dispersed any of the usual additives such as catalyst, lubricant, stabiliser, or plasticizer, and may be in granular or powder form. The thermosetting substance preferably is an essentially solid product of reaction between formaldehyde and a precursor selected from ureas, amino-s-triazines and phenols, for example dimethylol urea, dimethylol melamine, or a melamine-formaldehyde resin; a derivative thereof such as an alkylated, hexamethylol melamine; or a mixture or co-condensate of any of these substances with each other or with another thermosetting substance, such as a solid melamine unsaturated polyester co-condensate. The thermosetting substance preferably is a urea-, melamine-, or phenol-formaldehyde resin, optionally mixed or co-condensed with other thermosetting material such as an alkyd, diallyl phthalate or epoxy resin.

The thermosetting substance preferably is a thermosetting resin which is partly condensed but essentially solid at ambient temperatures in the absence of solubilizing quantities of water or other solvent. If a liquid plasticizer, such as water or monocresylglyceryl ether, or other liquid components is used, it should be present in such an amount that the thermosetting material is not liquid, nor (preferably) visibly wet. Preferably, not more than about 10% by weight (of the weight of the thermosetting substance) will be water or other solvent. Any volatile liquid used initially in the non-homogeneous blend, is preferably vented from the barrel during compounding. Since the resins used, or produced in the barrel, are of the condensation type, water or other volatile substance may be evolved during any condensation which may occur under the action of heat, as the filler and thermosetting material are progressed through the barrel. Thus the filler preferably is capable of absorbing the volatile material, or the barrel may be vented.

The more fully but not completely condensed material which issues from the downstream end of the barrel is moulded immediately by direc injection into a mould (or by the so-called injectioncompression technique) or by passing it directly into a heated extrusion head, and is thereby cured.

The non-homogeneous blend may be provided by one of several alternative methods, e.g.:
(1) by roughly mixing the filler with the thermosetting material in a mixer or blender and transferring the rough mixture to the hopper of the injection machine or extruder; or
(2) by introducing the filler and thermosetting material, or the filler and the thermosetting substance and additives, to the hopper and roughly mixing them together in the hopper, or
(3) providing the filler in one hopper, and the thermosetting material in another hopper and feeding these materials separately to the interior of the barrel so that the non-homogeneous blend is formed at the upstream end of the barrel.

The thermosetting material may itself be partially filled prior to formation of the non-homogeneous blend with the filler referred to above.

The injection moulding machine or extruder preferably has a single screw. It may be necessary to use a machine having a screw housing (barrel) suitably grooved internally, depending on the particle size of the filler or on the nature of the thermosetting material, particularly for thermosetting materials in finely powdered form, to obtain the desired feed characteristics.

Suitable fillers include powdered cellulose, woodflour, talc, $CaCO_3$, powdered glass, and the like, and the cured particulate aminoplast materials, described in our Belgian Patent Specifications Nos. 796,232 and 799,052.

The thermosetting materials may also be filled or reinforced, by means of the invention, with fibrous materials, such as cellulose, glass fibres, asbestos fibres, or carbon fibres, and may include any conventional additives or processing aids such as plasticizer, mould lubricant, curing agent or pigment. Pigment may be incorporated, in particular, by roughly blending it with the thermosetting material at the same time as the particulate filler is incorporated.

The following examples illustrate preferred embodiments of the invention.

EXAMPLES 1 AND 2.

A BIPEL 155/50 injection moulding machine (BIPEL is a Registered Trade Mark) was used, with two modifications:

(a) The standard barrel (screw housing) was replaced by one having longitudinal grooving, circumferentially spaced around the interior wall of the barrel and extending through substantially the whole length of the barrel; and (b) The feed hopper was provided with an agitator to effect continuous agitation of the contents of the hopper.

For both of the following formulations (Table 1), all the ingredients were charged to a Baker-Perkins Z—blade mixer, before blending commenced, and mixing was effected, from 10 to 30 minutes to produce a non-homogeneous blend of the synthetic plastics material (BL35 — a spray-dried melamine formaldehyde resin produced by our Chemicals Division), the filler, and the other ingredients. The 'rough' blend thus produced was fed to the hopper of the machine, and the machine was operated to agitate the contents of the hopper, feed them to the barrel, compound the non-homogeneous blend in the barrel and to produce test specimen mouldings.

The machine operating conditions and comments on the results are presented in Table 2.

TABLE 1

| Example | Ingredients | Parts by Weight | |
|---|---|---|---|
| 1. | BL 35 | 1956 | Thermo- |
|    | MCGE[1] | 148.5 | setting |
|    | Hexamine[2] | 14.9 | Material |
|    | Brooksite/M5 | 55.6 | |
|    | Lubricant | 30.0 | |
|    | Woodflour | 1000 | (Filler) |
| 2. | BL 35 | 2220 | Thermo- |
|    | Glycerol monostearate | 10.8 | setting Material |
|    | Lubricant | 9.0 | |
|    | Blue GLSR[3] | 22.0 | |
|    | Blue RS2[4] | 9.0 | Pigment |
|    | Black D.C.70[5] | 1.5 | |
|    | White RH42[6] | 1.2 | |
|    | Powdered Cellulose | 1000 | (Filler) |

NOTES
[1] Monocresylglyceryl ether.
[2] Hexamethylene Tetramine
[3] Ciba Geigy (U.K.) Ltd.
[4] Reckitts Colours Ltd.
[5] Blythe Colours Ltd.
[6] $TiO_2$-Laporte Industries Ltd.

EXAMPLE 3

A phenolic resin-based moulding material was produced from:

| | |
|---|---|
| Phenol novolak resin (m.p. 70° C) 100 parts | |
| Hexamethylene tetramine 12 parts | Thermosetting Material |
| Lubricant 2 parts | |
| Brown Pigment. 2 parts. | |
| Woodflour 110 parts (filler) | | by blending the ingredients in a Baker Perkins mixer for 10 minutes at ambient temperature, and feeding the rough blend to the stirred hopper of a BIPEL 70/31 injection moulding machine. The machine was operated under the conditions set out in Table 2, to produce mouldings from a DIN-bar tool as in the preceding Examples.

TABLE 2

| Ex. | Barrel Temp (°C) | Mould Temp. (°C) Fixed part. | Mould Temp. (°C) Moving part. | Injection Speed. (sec). | Injection pressure. (psi) | Screw Speed (r.p.m) | Screw Back Time (secs). | Screw Stroke (ins) | Back pressure. (psig). | Injection Times. (sec). | Cycle Time (secs) | Cycle Comment. |
|---|---|---|---|---|---|---|---|---|---|---|---|---|
| 1. | 80 | 148 | 148 | 2 | 20,000 | 60 | 5 | 1.375 | 700 | 5 | 45 | Consistant Mouldings. |
| 2. | 80 | 148 | 148 | 2 | 20,000 | 60 | 6 | 1.375 | 700 | 25 | 125 | Fair pigment dispersion. |
| 3. | 90 | 165 | 165 | 2.5 | 24,000 | 60 | 6 | 1.38 | 1400 | 10 | 55 | Good Mouldings. |

NOTES
1. Monocresylglyceryl ether.
2. Hexamethylene Tetramine
3. Ciba Geigy (U.K.) Ltd.
4. Reckitts Colours Ltd
5. Blythe Colours Ltd.
6. $TiO_2$-Laporte Industries Ltd In the following examples, thermosetting materials were made from the thermosetting substances and additives as defined and formed into nom-homogeneous blends with the fillers, as defined, in a manner similar to that described in Examples 1 to 3. All parts are weight. The operating conditions of the injection moulding machine are given in Table 3, and the properties of the completed mouldings in Table 4.

EXAMPLE 4

| BL 35 | 2220 parts | Thermosetting |
| Lubricant | 20 parts | material |
| Catalyst | 3.2 parts | |
| Powdered Cellulose | 900 parts | Filler |
| BaSO₄ | 100 parts | |

EXAMPLE 5

| Thermosetting material as in Ex.4 | 2543.2 parts | |
| Powdered cellulose | 700 parts | |
| 1/8" glass fibres | 300 parts | Filler |
| BaSO₄ | 100 parts | |

EXAMPLE 6

| Urea-formaldehyde resin | 1400 parts | Thermo- |
| Lubricant | 10 parts | setting |
| Plasticizer | 40 parts | Material |
| catalyst | 1.4 parts | |
| Powdered cellulose | 4.76 parts | Filler |
| BaSO₄ | 133 parts | |

The urea-formaldehyde resin was produced by reacting dimethylol urea and urea in a weight ratio of 10:1.

EXAMPLE 7

| Melamine-urea-formaldehyde resin | 1600 parts | Thermo- |
| Stabilizer | 67 parts | setting |
| Lubricant | 27 parts | Material |
| Woodflour (filler) | 1070 parts | |

The melamine-urea-formaldehyde resin was made by blending:

| Melamine-formaldehyde resin | 100 parts |
| Urea-formaldehyde resin | 200 parts |
| formaldehyde | 165 parts |
| plasticizer | 40 parts |

EXAMPLE 8

| Solid alkyd as incorporated in BEETLE 4128 polyester resin* | 1000 parts | |
| BL 35 | 1000 parts | Thermo- |
| Diallyl phthalate | 100 | setting |
| Tertiary butyl peroxide | 50 | Material |
| Silane coupling agent | 13 | |
| Lubricant | 70 | |
| Powdered cellulose | 1200 | |
| "Millicarb" CaCO₃ | 1000 | Filler |
| China Clay | 780 | |

*BEETLE is a Registered Trade Mark. The alkyd and melamine formaldehyde resins crosslink to produce a mixed resin system in the cured articles.

EXAMPLE 9

| BL 35 | 1400 parts | |
| Phenolic resin | 700 parts | Thermo- |
| Lubricant | 20 parts | setting |
| Catalyst | 2 parts | material |
| Woodflour | 1000 parts | Filler |
| BaSO₄ | 150 parts | |

EXAMPLE 10

| Phenol-formaldehyde resin | 950 parts | Thermosetting |
| Hexamethylene tetramine | 75 parts | setting |
| Lubricant | 32 parts | Material |
| Woodflour | 950 parts | |
| Talc | 150 parts | Filler |

TABLE 3

| EXAMPLE | 4 | 5 | 6 | 7 | 8 | 9 | 10 |
|---|---|---|---|---|---|---|---|
| Barrel Temp °C | 95 | 95 | 90 | 90 | 50 | 100 | 95 |
| Mould Temp °C | 165 | 165 | 150 | 150 | 165 | 165 | 165 |
| Injection Pressure (p.s.i) | 1750 | 1750 | 1750 | 1750 | 1750 | 1750 | 1750 |
| Hold-on Pressure (p.s.i) | 700 | 700 | 700 | 700 | 700 | 700 | 700 |
| Injection Times (secs) | 10 | 10 | 10 | 10 | 10 | 10 | 10 |
| Total cycle time (secs) | 40 | 40 | 20 | 20 | 40 | 40 | 50 |

TABLE 4

| Property | Example 4 | 5 | 6 | 7 | 8 | 9 | 10 |
|---|---|---|---|---|---|---|---|
| Flexural Strength (MN/m²) | 77 | 66 | 87 | 95 | 48 | 84 | 59 |
| Flexural Modulus (GN/m²) | 4.8 | 6.0 | 4.8 | 5.5 | 4.5 | 5.4 | 5.4 |
| Engergy to Break (KJ/m²) | 618 | 363 | 788 | 820 | 256 | 654 | 322 |
| Deflection at break (mm) | 1.6 | 1.1 | 1.8 | 1.7 | 1.1 | 1.6 | 1.1 |
| Boiling Water absorption (mg/g) | 22 | 23 | 25 | 50 | 10 | 17 | 21 |
| Insulation resistance ($10^{10}$ ohms) | 1.3 | 3.3 | 27 | 1.6 | 43 | 40 | 5.3 |

In each of Examples 4 to 9, the mouldings produced were in the form of pin-gated bars. These showed acceptable surface finish, mechanical strength and physical properties.

The operating conditions of the injection moulding machine (or of an extruder) can be selected readily by those skilled in the art. For machines of the general type used as described above, preferred conditions are:

Barrel temperature 80° to 110° C
Mould temperature 140° to 170° C
Injection pressure up to 20000 p.s.i.
Total cycle time 15 to 130 seconds.

These may be varied at will depending on the materials being used and the type of mouldings to be produced. An extruder will, of course, be provided with an extruder head capable of being heated to a temperature sufficiently high to cure material passing through it.

Heretofore, it has been necessary for trade moulders to order from manufacturers moulding compositions containing a suitable amount and type of filler for the particular application which the moulder has in hand. Accordingly it has often been necessary for the moulding composition manufacturers to hold stocks of different moulding compositions, based on the same resinous material but incorporating different amounts and/or types of homogeneously dispersed filler, hence space which could be put to better use is often required for storage of such stocks.

By virtue of the present invention, it is now possible for the moulding composition manufacturer to produce only unfilled or partially filled synthetic thermosetting materials for supply to trade moulders who themselves, without much effort or capital expenditure, can roughly mix the thermosetting material with the desired amount and type of filler to produce the non-homogeneous blend referred to above.

We claim:

1. The method of injection moulding amino-formaldehyde thermosetting material to produce a cured artefact having filler homogeneously dispersed therewithin without requiring the preliminary step of compounding a moulding powder having the filler already homogeneously dispersed therein, which comprises the steps of:
    (a) providing a dry thermosetting amino-formaldehyde material which is partly condensed but essentially solid at ambient temperatures;
    (b) introducing said dry material and filler in at best a rough, non-homogeneous blend directly into the barrel of an injection moulding machine in the absence of solubilizing quantities of solvent, said machine having a heated barrel and a rotary screw which is axially movable in said barrel;
    (c) rotating said screw simultaneously to feed the blend along the barrel, further condense the material, plasticize said material and impregnate the filler with the plasticized material to provide a homogeneous blend, and effect transfer of homogeneous blend ahead of the screw by screw-back of the screw;
    (d) injecting homogeneous blend from ahead of the screw into a heated mould; and
    (e) curing the artefact in the mould.

2. The method as defined in claim 1 wherein the material of step (a) is partly condensed melamine-formaldehyde material.

3. The method as defined in claim 1 wherein the material of step (a) is partly condensed urea-formaldehyde material.

4. The method as defined in claim 1 wherein the material of step (a) is a blend of partly condensed melamine-formaldehyde and urea-formaldehyde.

5. The method of injection moulding amino-formaldehyde thermosetting material to produce a cured artefact having pigment as well as filler homogeneously dispersed therewithin without requiring the preliminary step of compounding a moulding powder having the filler and pigment already homogeneously dispersed therein, which comprises the steps of:
    (a) providing a dry thermosetting amino-formaldehyde material which is partly condensed but essentially solid at ambient temperatures;
    (b) introducing said dry material, pigment and filler in at best a rough, non-homogeneous blend directly into the barrel of an injection moulding machine in the absence of solubilizing quantities of solvent, said machine having a heated barrel and a rotary screw which is axially movable in said barrel;
    (c) rotating said screw simultaneously to feed the blend along the barrel, further condense the material, plasticize said material and impregnate the filler with the plasticized material and disperse the pigment therein to provide a homogeneous blend, and effect transfer of homogeneous blend ahead of the screw by screw-back of the screw;
    (d) injecting homogeneous blend from ahead of the screw into a heated mould; and
    (e) curing the artefact in the mould.

6. The method as defined in claim 5 wherein the material of step (a) is partly condensed melamine-formaldehyde material.

7. The method as defined in claim 5 wherein the material of step (a) is partly condensed urea-formaldehyde material.

8. The method as defined in claim 5 wherein the material of step (a) is a blend of partly condensed melamine-formaldehyde and urea-formaldehyde.

* * * * *